US008990942B2

(12) United States Patent
Thakadu et al.

(10) Patent No.: US 8,990,942 B2
(45) Date of Patent: Mar. 24, 2015

(54) METHODS AND SYSTEMS FOR API-LEVEL INTRUSION DETECTION

(71) Applicants: Anand Thakadu, Redmond, WA (US); Anirban Bhattacharya, Bangalore (IN); Kuldip Shetty, Sastan (IN); Krishna Prasad Muraleedharan Pillai, Perumbavoor (IN); Ravi Udaya Kumble, Bangalore (IN); Sourav Bhattacharya, Fountain Hills, AZ (US); Venu Aluri, Gudlavalleru (IN); Vitesh Patel, Bilaspur (IN)

(72) Inventors: Anand Thakadu, Redmond, WA (US); Anirban Bhattacharya, Bangalore (IN); Kuldip Shetty, Sastan (IN); Krishna Prasad Muraleedharan Pillai, Perumbavoor (IN); Ravi Udaya Kumble, Bangalore (IN); Sourav Bhattacharya, Fountain Hills, AZ (US); Venu Aluri, Gudlavalleru (IN); Vitesh Patel, Bilaspur (IN)

(73) Assignee: Wipro Limited, Bangalore (IN)

( * ) Notice: Subject to any disclaimer, the term of this patent is extended or adjusted under 35 U.S.C. 154(b) by 56 days.

(21) Appl. No.: 13/893,943

(22) Filed: May 14, 2013

(65) Prior Publication Data
US 2014/0237594 A1 Aug. 21, 2014

(30) Foreign Application Priority Data

Feb. 18, 2013 (IN) .............................. 712/CHE/2013

(51) Int. Cl.
*G06F 21/00* (2013.01)
*G06F 21/55* (2013.01)
*G06F 21/52* (2013.01)

(52) U.S. Cl.
CPC ................ *G06F 21/55* (2013.01); *G06F 21/52* (2013.01); *G06F 21/554* (2013.01)

USPC .......................................................... 726/23

(58) Field of Classification Search
None
See application file for complete search history.

(56) References Cited

U.S. PATENT DOCUMENTS

| 7,318,163 | B2 | 1/2008 | Armingaud et al. |
| 7,334,254 | B1 | 2/2008 | Boydstun et al. |
| 7,363,342 | B1 | 4/2008 | Wang et al. |
| 7,370,075 | B2 | 5/2008 | Farquharson et al. |
| 7,398,532 | B1 | 7/2008 | Barber et al. |
| 7,712,126 | B2 | 5/2010 | Andersson et al. |
| 7,757,271 | B2 | 7/2010 | Amdur et al. |
| 7,788,716 | B2 | 8/2010 | Dapkus et al. |
| 7,849,509 | B2 | 12/2010 | Venkatapathy et al. |
| 7,908,659 | B2 | 3/2011 | Jeffries et al. |
| 8,245,289 | B2 | 8/2012 | Chahal |

(Continued)

FOREIGN PATENT DOCUMENTS

| CN | 1731310 | 2/2006 |
| GB | 2389736 | 12/2003 |

(Continued)

*Primary Examiner* — Jeffrey Pwu
*Assistant Examiner* — William Corum, Jr.
(74) *Attorney, Agent, or Firm* — Finnegan, Henderson, Farabow, Garrett & Dunner, L.L.P.

(57) ABSTRACT

This disclosure generally relates to computer security, and more particularly to methods and systems for application programming interface (API)-level intrusion detection. In some embodiments, a computer-readable medium is disclosed, storing instructions for: receiving an API call for a service at an API sandbox module; parsing the API call to extract at least one of: an API call name; and or one or more API call parameters; generating a copy of the at least one of: the API call name and or the one or more API call parameters; determining, via an intrusion detection rules execution engine, whether the API call violates one or more security rules obtained from a security rules object, using the copy of the at least one of: the API call name and or the one or more API call parameters; and providing an indication of whether the API call violates the one or more security rules.

29 Claims, 11 Drawing Sheets

Private, scalable, rapidly-deployable API-level intrusion detection

(56) References Cited

U.S. PATENT DOCUMENTS

| | | | |
|---|---|---|---|
| 2002/0066022 A1* | 5/2002 | Calder et al. | 713/200 |
| 2002/0171546 A1* | 11/2002 | Evans et al. | 340/540 |
| 2003/0014661 A1 | 1/2003 | Ohi | |
| 2003/0208533 A1 | 11/2003 | Farquharson et al. | |
| 2005/0005162 A1 | 1/2005 | Oliphant | |
| 2005/0005171 A1 | 1/2005 | Oliphant | |
| 2005/0022003 A1 | 1/2005 | Oliphant | |
| 2006/0161982 A1* | 7/2006 | Chari et al. | 726/23 |
| 2006/0230452 A1 | 10/2006 | Field | |
| 2007/0112941 A2 | 5/2007 | Oliphant | |
| 2007/0113272 A2 | 5/2007 | Oliphant | |
| 2008/0016339 A1* | 1/2008 | Shukla | 713/164 |
| 2008/0134286 A1 | 6/2008 | Amdur et al. | |
| 2008/0244685 A1 | 10/2008 | Andersson et al. | |
| 2009/0119775 A1 | 5/2009 | Armingaud et al. | |
| 2009/0235349 A1 | 9/2009 | Lai et al. | |
| 2009/0327514 A1 | 12/2009 | Foschiano et al. | |
| 2010/0115585 A1* | 5/2010 | Cohen | 726/3 |
| 2010/0146291 A1 | 6/2010 | Anbuselvan | |
| 2011/0078790 A1 | 3/2011 | Fazunenko et al. | |
| 2011/0145842 A1 | 6/2011 | Tofighbakhsh et al. | |
| 2011/0145920 A1* | 6/2011 | Mahaffey et al. | 726/22 |
| 2011/0307955 A1* | 12/2011 | Kaplan et al. | 726/23 |
| 2012/0159570 A1 | 6/2012 | Reierson et al. | |
| 2012/0240222 A1 | 9/2012 | Chahal | |
| 2013/0055341 A1* | 2/2013 | Cooper et al. | 726/1 |

FOREIGN PATENT DOCUMENTS

| | | |
|---|---|---|
| GB | 2422919 | 8/2006 |
| KR | 20080050269 | 6/2008 |
| KR | 20090021038 | 2/2009 |
| TW | 201209619 | 3/2012 |
| WO | WO 2006020095 | 2/2006 |

* cited by examiner

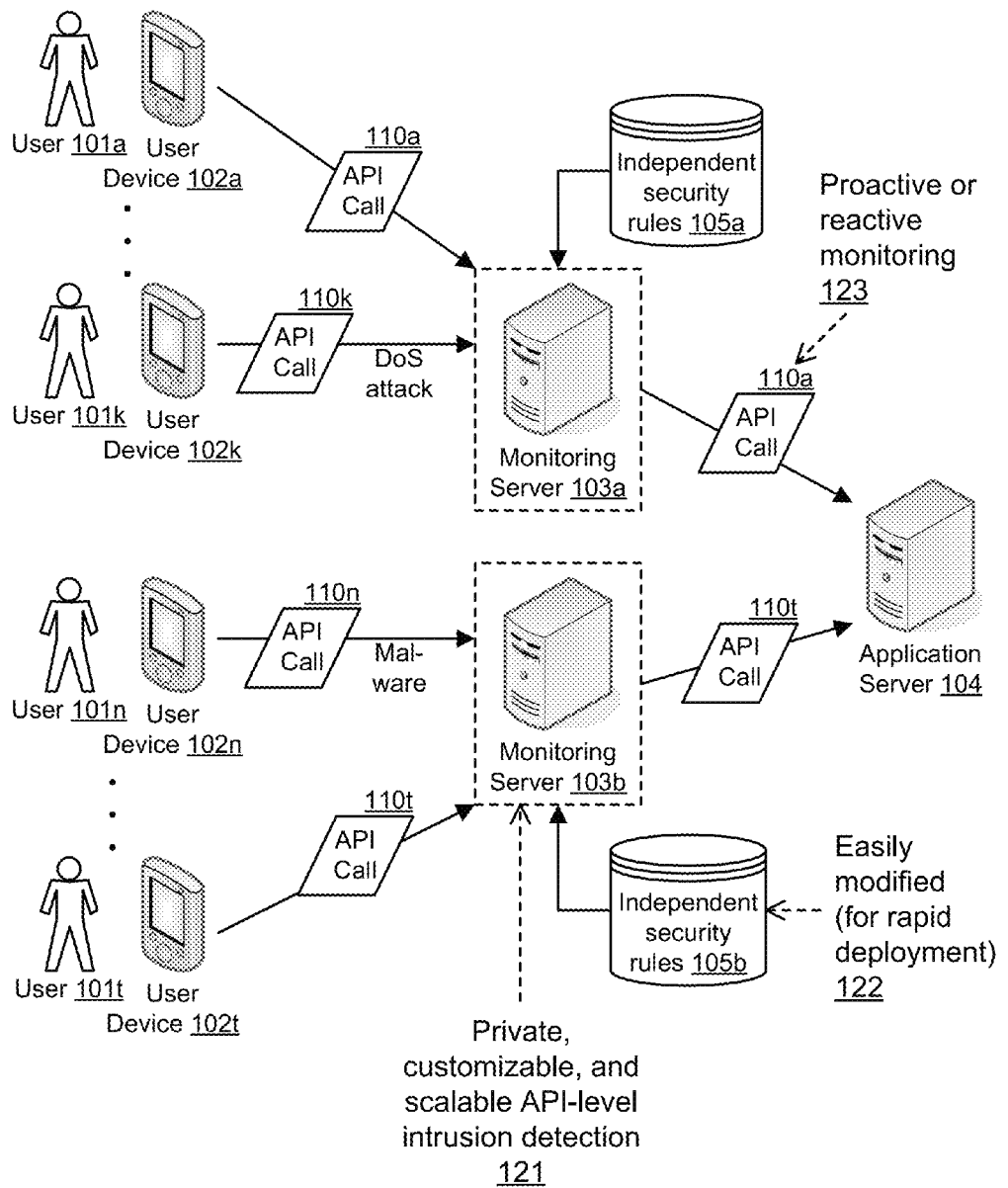
FIG. 1: Private, scalable, rapidly-deployable API-level intrusion detection

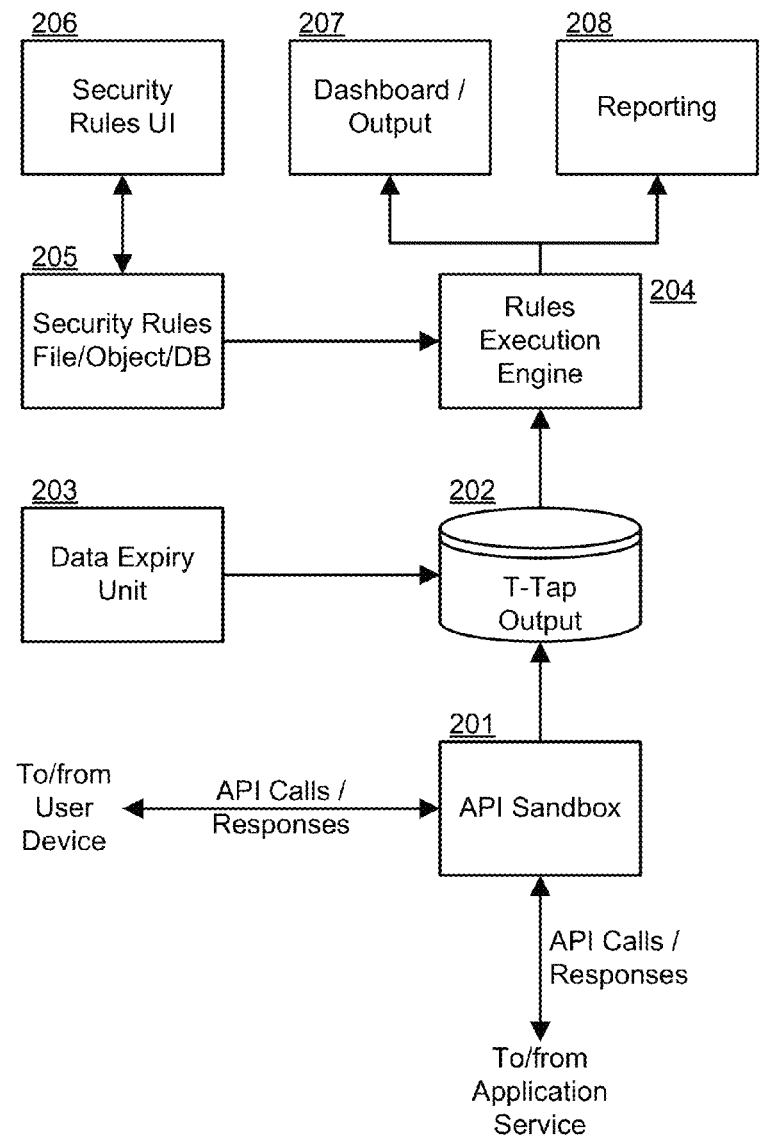
FIG. 2: Intrusion detection system architecture

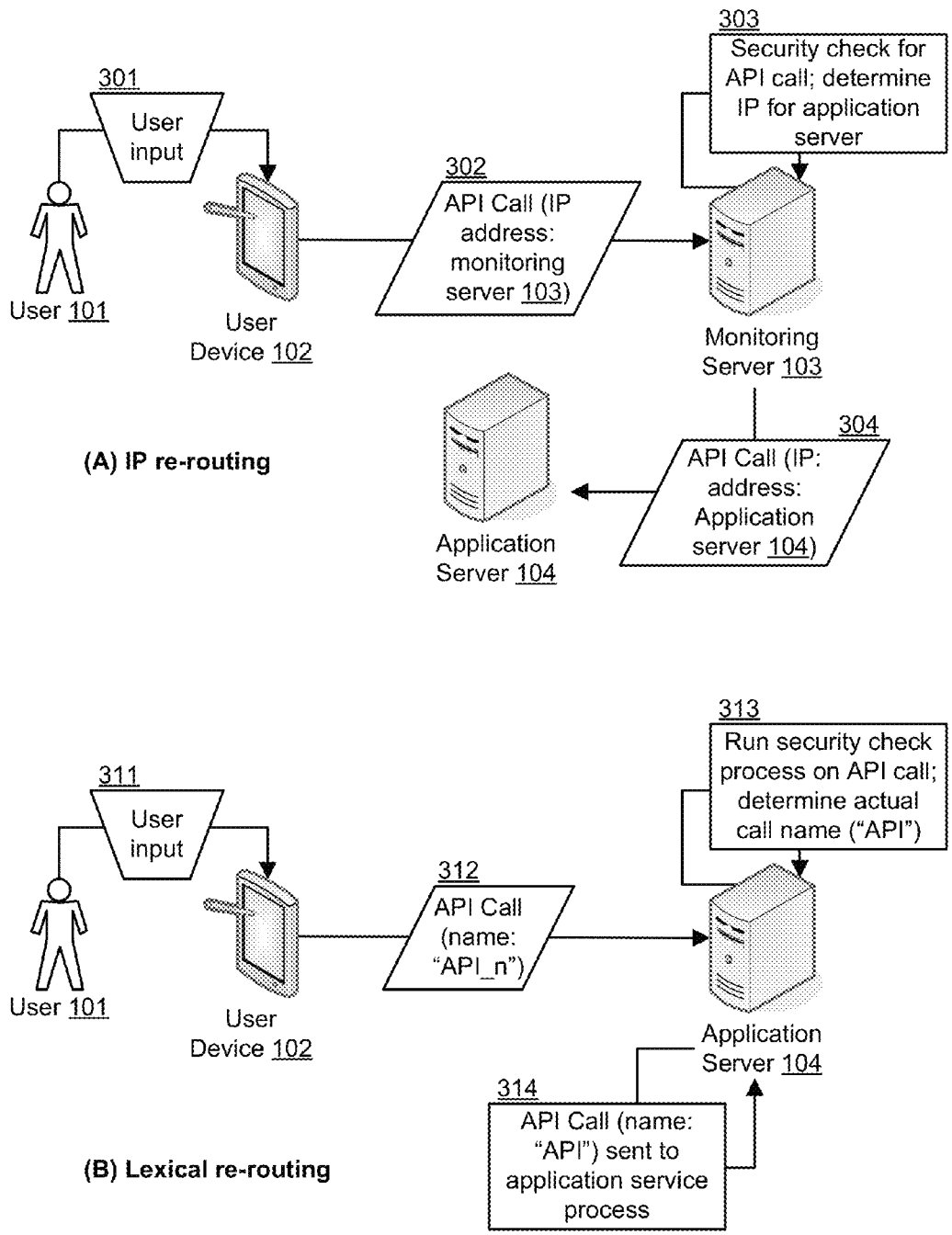
FIG. 3: IP and Lexical API call re-routing

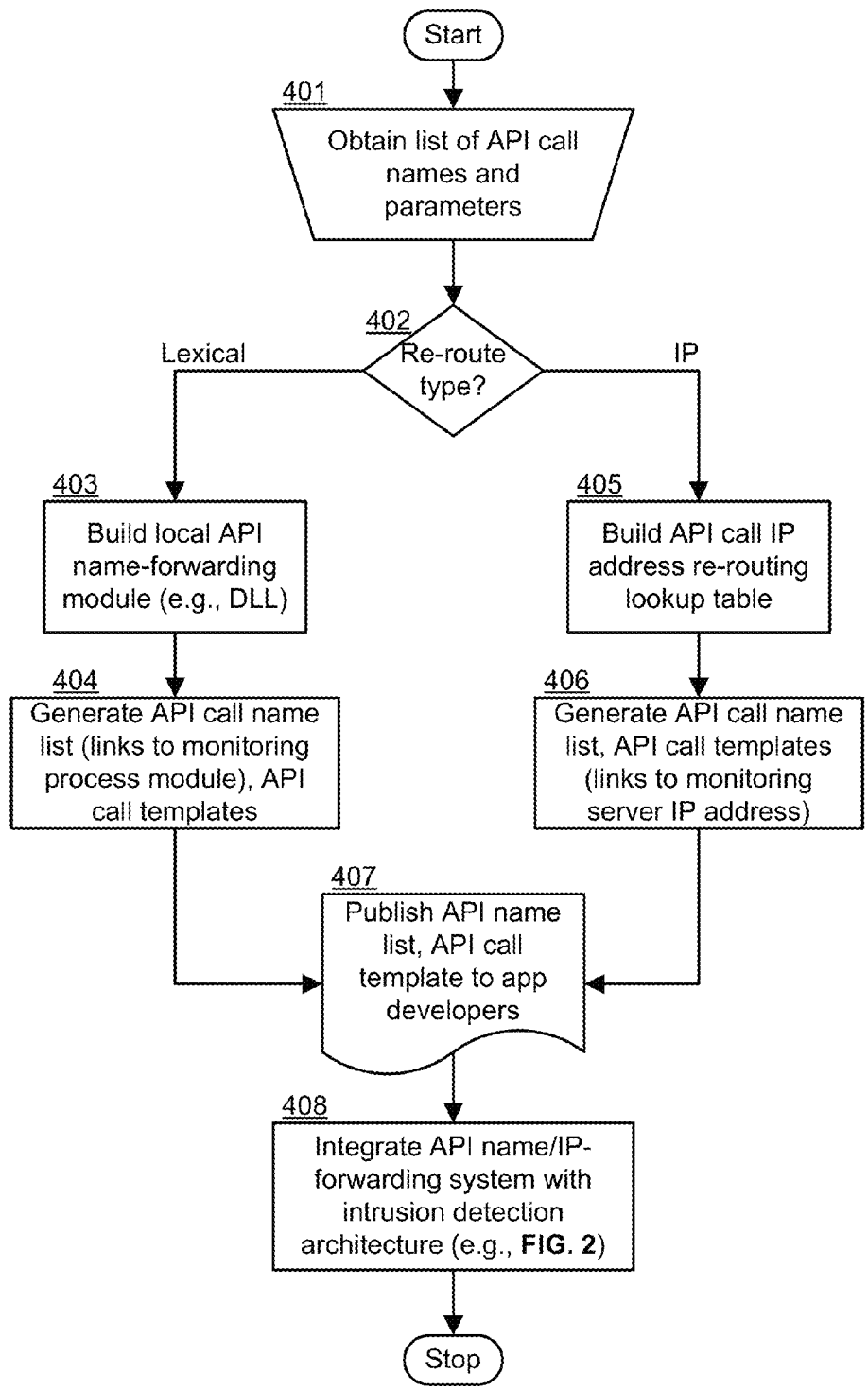
FIG. 4: Pre-deployment API call re-routing configuration

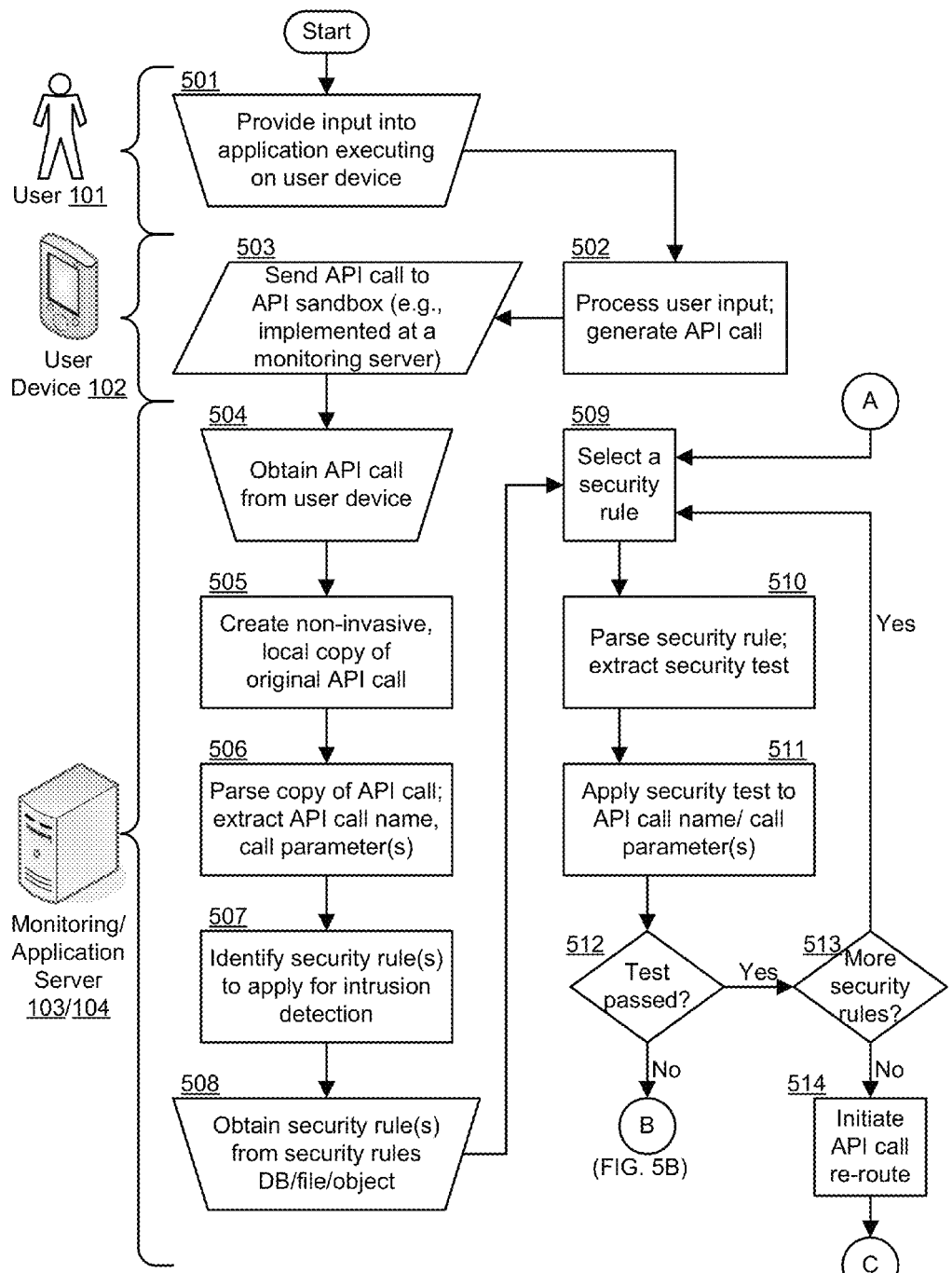
FIG. 5A: Exemplary API-level intrusion detection and re-routing

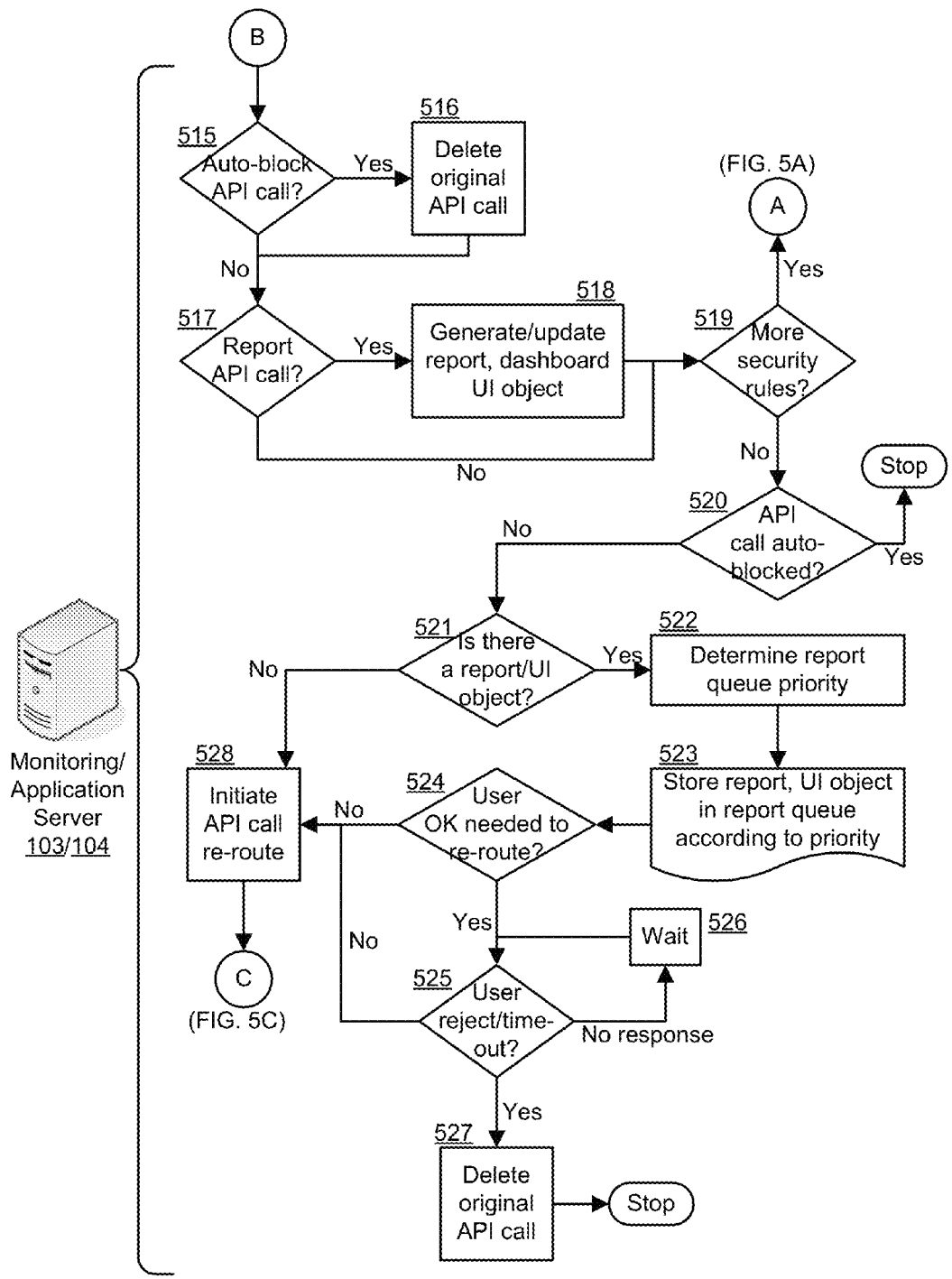
FIG. 5B: Exemplary API-level intrusion detection and re-routing

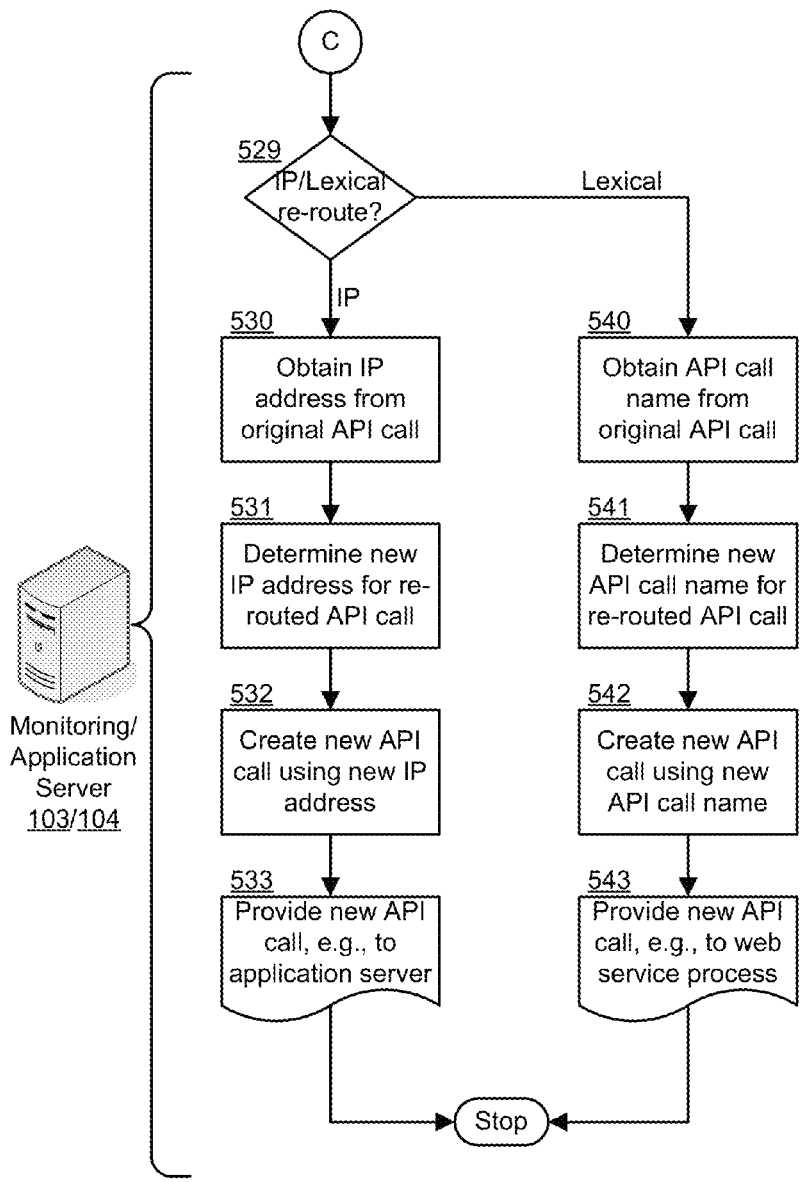
FIG. 5C: Exemplary API-level intrusion detection and re-routing

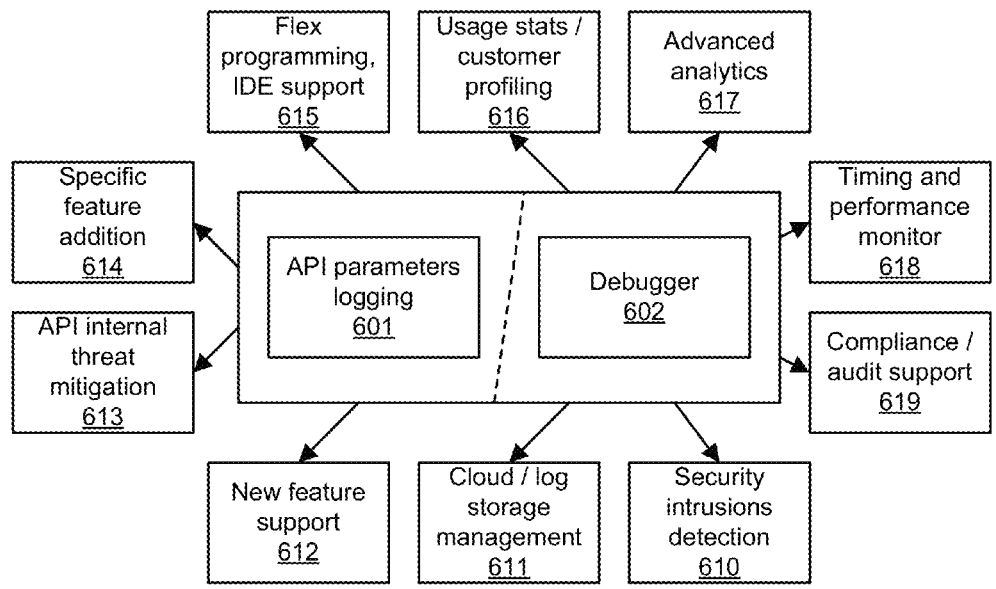
FIG. 6A: User interface features

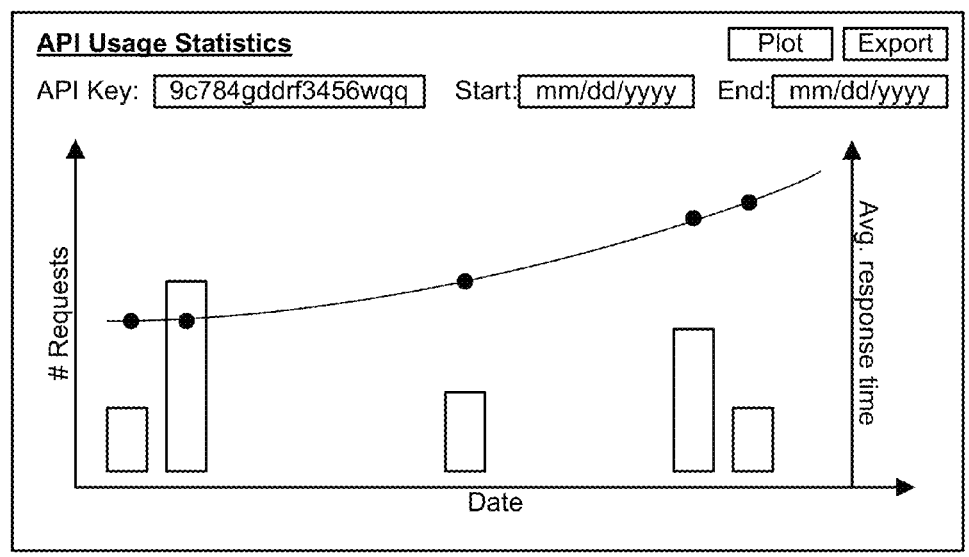
(1) Example dashboard output
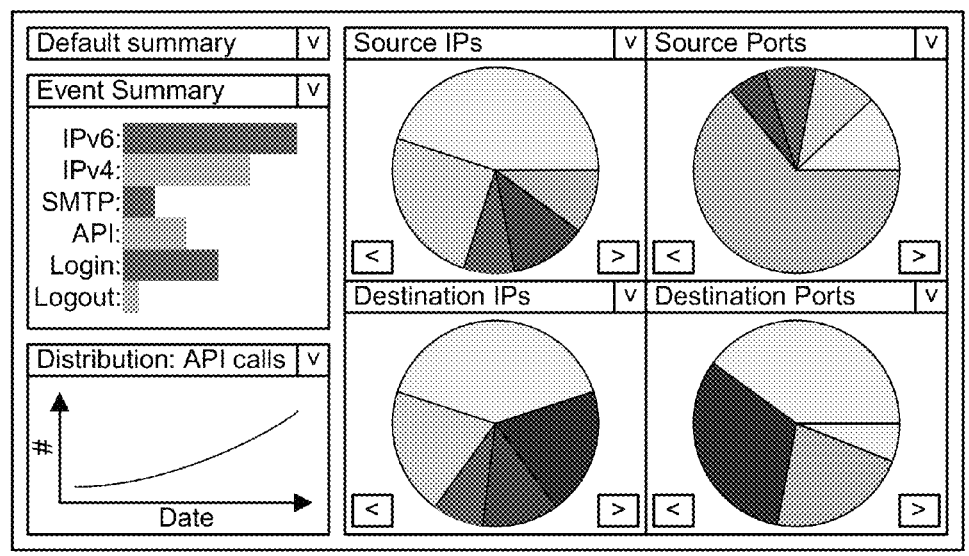
(2) Example threat incidence output
FIG. 6B: User interface features

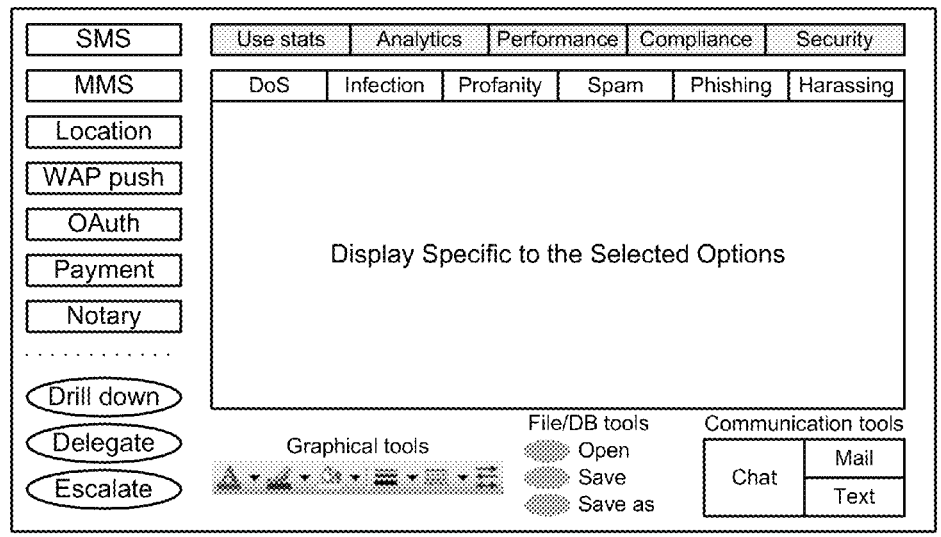
Example SMS application dashboard
FIG. 6C: User interface features

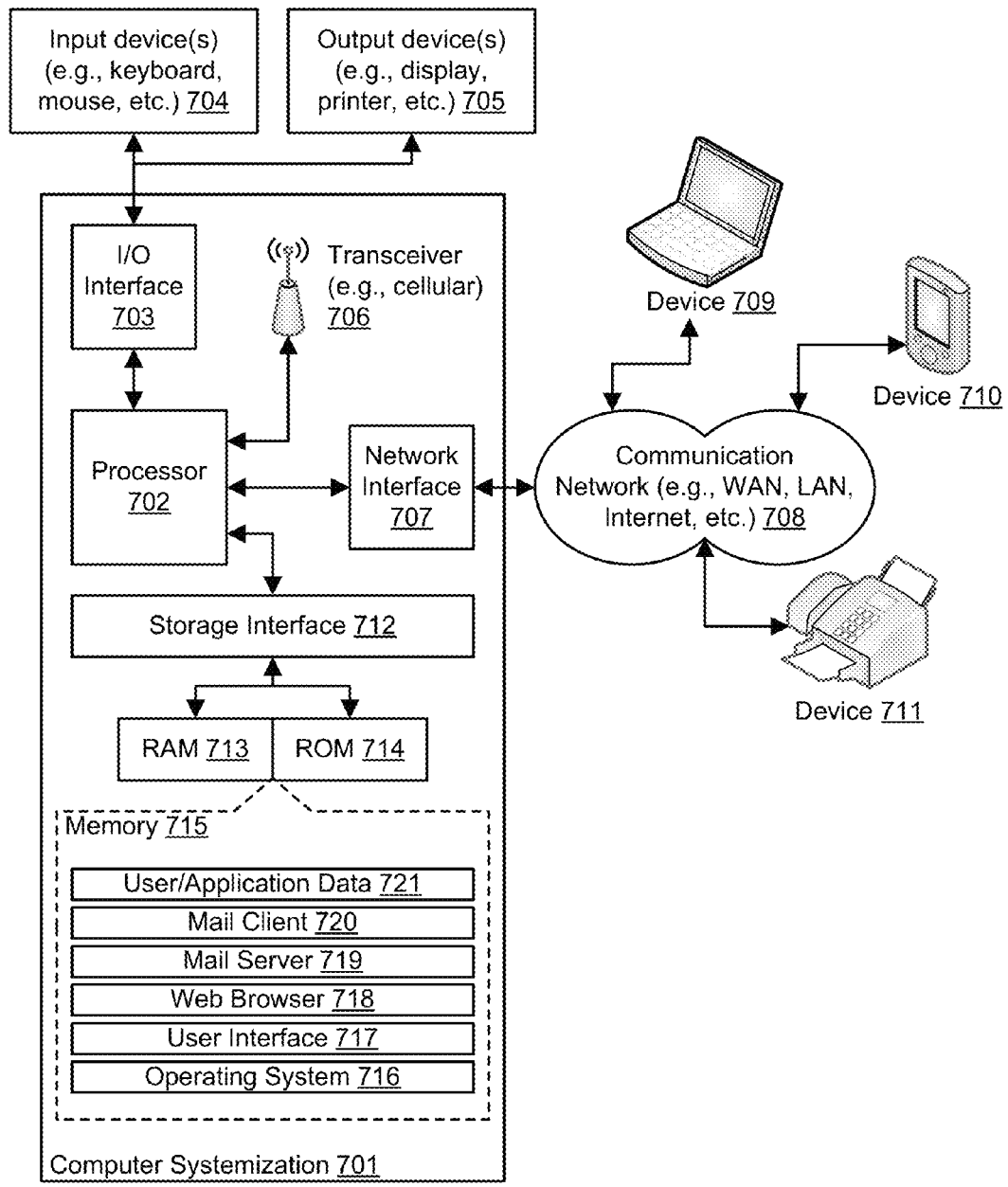
FIG. 7: Exemplary Computer Systemization

US 8,990,942 B2

METHODS AND SYSTEMS FOR API-LEVEL INTRUSION DETECTION

PRIORITY CLAIM

This disclosure claims priority under 35 U.S.C. §119 to: India Application No. 712/CHE/2013, filed Feb. 18, 2013, and entitled "METHODS AND SYSTEMS FOR API-LEVEL INTRUSION DETECTION." The aforementioned application is incorporated herein by reference in its entirety.

TECHNICAL FIELD

This disclosure generally relates to computer security, and more particularly to methods and systems for API-level intrusion detection.

BACKGROUND

Web services may be protected from intrusions (e.g., denial-of-service attacks, malware, etc.) using intrusion detection systems (IDS). Intrusion detection systems typically operate on individual Internet Protocol (IP) data packets, and are generally network-based (NIDS) or host-based (HIDS). A NIDS scans network packets at the router-level, and logs information on suspicious packets into a log file. A HIDS monitors a single computer system's state, memory, and packets received at its network interface for violations of that host's security policies. IDS systems' executions are commonly categorized as Behavior-Based or Anomaly-Based. IDS implementations and products may be designed anywhere from software-only to completely embedded hardware/appliance boxes. Recent advances in IDS have focused on Application level IDS, where the IDS rules are neither at the host nor at the network, instead the IDS rules are coded along with the Application. The benefits of Application level IDS includes the fact that an Application developer can usually tell what is/are the right usage, and likewise what is/are the wrong usage of the Application, and hence the latter (i.e., the wrong usage) are best captured at the Application programming level.

SUMMARY

In one embodiment, a non-transitory computer-readable medium is disclosed, storing computer-executable instructions for: receiving an application programming interface (API) call for a service at an API sandbox module; parsing the API call to extract at least one of: an API call name; and or one or more API call parameters; generating a copy of the at least one of: the API call name and or the one or more API call parameters; providing, to an intrusion detection rules execution engine, the copy of the at least one of: the API call name and or the one or more API call parameters; determining, via the intrusion detection rules execution engine, whether the API call is in violation of one or more security rules obtained from a security rules object; and providing an indication of whether the API call is in violation of the one or more security rules. In another embodiment, a non-transitory computer-readable medium is disclosed, storing intrusion detection rules at an SDK, with the SDK capturing the API calls and executing the intrusion detection rules, wherein the selection of specific APIs and selection of specific calling Applications for intrusion rules execution may be customized with a user interface, and wherein the security rules for the intrusion detection may also be customized with a user interface. In another embodiment the SDK may be co-located at an enterprise level software gateway tunneling all selected API calls from/to within the enterprise prior to/from transmittal external to the enterprise unto the Internet.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 1 is a block diagram illustrating exemplary aspects of an API-level intrusion detection system according to some embodiments of the present disclosure.

FIG. 2 is a block diagram illustrating an exemplary intrusion detection system architecture according to some embodiments of the present disclosure.

FIG. 3 is a block diagram illustrating IP address and lexical re-routing of API calls in accordance with some embodiments of the present disclosure.

FIG. 4 is a flow diagram illustrating a pre-deployment API call re-routing configuration according to some embodiments of the present disclosure.

FIGS. 5A-C are flow diagrams illustrating an exemplary API-level intrusion detection and re-routing procedure in accordance with some embodiments of the present disclosure.

FIGS. 6A-C are block and user interface diagrams illustrating exemplary aspects of user interfaces in accordance with some embodiments of the present disclosure.

FIG. 7 is a block diagram of an exemplary computer system for implementing embodiments consistent with the present disclosure.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

FIG. 1 is a block diagram illustrating exemplary aspects of an API-level intrusion detection system according to some embodiments of the present disclosure. In some embodiments, an intrusion detection system, operating at the application programming interface (API)-level rather than at the network (e.g., Internet Protocol (IP)) packet-level, may be implemented as an intermediary between end user devices (e.g., 102a-k, 102n-t) and an application server 104 providing a web application service for all the users. Because a number of intermediary monitoring servers (e.g., 103a-b) may be implemented, each monitoring server serving a sub-group of users (e.g., 102a-k; 102n-t), the security rules each sub-group of users is subjected to can be customized easily, providing flexibility in implementing intrusion detection systems. At the same time, because a single monitoring server 103a can serve a large sub-group of users, being a centralized solution, the intrusion detection system is scalable to large number of users. Further, each monitoring system may utilize an independent secure database of security rules (see 105*a-b*). Thus, the security rules may be easily customized from a centralized source, and the resulting new security rules/policies may be rapidly deployable among the user community. Also, the security rules and access to the monitoring servers 103*a-b* may be strictly controlled so that neither users/application developers, nor the web application service provider, can know the specific security rules to which their actions will be subject. Such access control to the security policies may ensure greater strength of security, and increase the difficulty of a malicious agent circumventing the implemented security policies. Thus, a measure of privacy may be obtained for the users from both the application developer as well as the web application service provider, and the web application service provider may benefit from making it more difficult for application developers to circumvent the security rules. Finally, when an API call (e.g., 110*a-k*, 110*n-t*) is found to be in violation of one or more security rules (e.g., in FIG. 1, API calls 110*k* and 110*n* are shown to be in violation for attempting a denial-of-service attack and a malware infection, respectively) the monitoring server may engage in either reactive or proactive screening of the API calls. For example, in proactive monitoring, the monitoring server may reject/erase/delete the offending API call without any requirement of user intervention if a security rule is violated. In reactive monitoring, the monitoring server may flag an offending API call for further review by a security administrator, while allowing the API call to either continue without any need for express authorization, or after authorization is obtained from the security administrator.

FIG. 2 is a block diagram illustrating an exemplary intrusion detection system architecture according to some embodiments of the present disclosure. In some embodiments, an API sandbox (see 201) is provided that may receive API calls from user devices, make a local and non-invasive copy of both the called API names and API parameters, and pass the API call to the original web service provider, e.g., provided that the intrusion detection system and/or security administrators authorize the passing of the API call to the original web service provider. In some embodiments, the API sandbox may be co-located at an enterprise software gateway. The API sandbox may be configured to receive all API calls from all applications, or only some API calls having specific API call names, or API calls only from a subset of applications (e.g., API calls originating from applications developed by specific application developers; applications of a specific type (e.g., games, business software, etc.), applications of a specific usage level, etc.), or other like subsets of API calls. The integration of the intrusion detection system with the original web service provider, and the passing of the API call to the original web service provider may be implemented either via Internet Protocol (IP) address re-routing, or via lexical re-routing, or combinations thereof, both of which are discussed below with reference to FIG. 3.

In some embodiments, the local copy created by the API sandbox may be provided via a T-Tap output (see 202) to a rules execution engine (see 204). The T-Tap and API sandbox ensure that the data and local API copy being operated on (e.g., by the rules execution engine, dashboard UI, etc.) are not accessible to modules on the other side of the API sandbox, and other modules or data "outside" the API sandbox may not become involved in processes executed "within" the API sandbox. The rules execution engine may obtain data upon which to operate from a data expiry unit (see 203). For example, the data expiry unit may store the API call names and API call parameters (e.g., input variables, source IP address, destination IP address, user ID, etc.) up to a time period beyond which the storage is freed and new data are stored on a FIFO (first in first out) basis. The data expiry unit may be implemented as a relational database, file (e.g., CSV, text file, etc.), object stored in memory, etc. The rules execution engine may obtain security rules for processing the API call from a security rules file, object, or database, etc. (see 205). The security rules may be modified through a graphical user interface (GUI) like a security rules UI (see 206). The results of the security rules processing of the API calls may be reported (see 208) or displayed via a graphical user interface dashboard/output (see 207).

FIG. 3 is a block diagram illustrating IP address and lexical re-routing of API calls in accordance with some embodiments of the present disclosure. In some embodiments, an input (e.g., 301, 311) by a user 101 into a user device 102 may trigger the device to generate an API call (e.g., 302, 312) for a web application service provided by an application server 104. The intrusion detection system of the present disclosure may be configured in combinations of at least two ways to interpose the intrusion detection system between the user device and the application service: IP re-routing and lexical re-routing.

In some embodiments implementing IP re-routing, the intrusion detection system architecture (see FIG. 2) may be implemented in a separate monitoring server 103. An API call 302 generated by the user device 102 may first be directed to the IP address of the monitoring server 103. API calls may be renamed lexically at the source to ensure that the calls first go to a security check process (e.g., implemented as a dynamic-link library (DLL)), for intercept and security check, prior to being forwarded to the web application server for user request processing. Upon receiving the API call from the user device, the monitoring server may perform a security check for the API call, determine whether the API call can be forwarded to the application server 104 implementing the web application service, and determine the IP address of such application server 104. Once the monitoring server determines that the API call can be forwarded, the monitoring server may forward the API call (see 304) to the IP address corresponding to the application server.

In some embodiments implementing lexical re-routing, the user device 102 may provide the API call 312 directly to the application server 104, but the API call 312 may be intercepted by a security check process (e.g., implemented as a dynamic-link library (DLL)) rather than the web application service process executing on the application server 104. Upon receiving the API call from the user device, the security check or intrusion monitoring or intrusion detection process may perform a security check for the API call, determine whether the API call can be forwarded to the web application service process, and determine the API name corresponding to such application service process. Once the monitoring process determines that the API call can be forwarded, the monitoring process may forward the API call (see 314) to the web application service process executing on the application server.

FIG. 4 is a flow diagram illustrating pre-deployment API call re-routing configuration according to some embodiments of the present disclosure. In some embodiments, an application server may provide a number of features for application developers and user. The intrusion detection system (IDS) may obtain a list of application programming interface (API) call names and associated API call parameters from the application service provider (see 401). The IDS may also obtain an indication of the type of routing to be performed. If the IDS determines that lexical routing is to be performed (see 402), the IDS may build a module to perform API name-forwarding in accordance with the lexical routing scheme (see, e.g., FIG.

3). For example, the IDS may build a local dynamic-link library (DLL) implementing the API name-forwarding module (see 403). The IDS may also generate an API call name list and API call templates. In this procedure, the API call names may link to the intrusion detection/monitoring process module (see 404). If the IDS determines that IP re-routing is to be performed (see 402), the IDS may build a lookup table that maps IP addresses used to access the monitoring server to the IP addresses of the application server performing the application service (see 405). The IDS may also generate an API call name list and API call templates. In this procedure, the API call templates may be configured so that the API calls are directed to the monitoring server (e.g., using the monitoring server's IP address) (see 406). Once the API call name list and API call templates have been generated, the IDS may publish the API call name list and API call templates to application developers (see 407). Also, the IDS may integrate the API name/IP-address forwarding system (e.g., depending on whether IP or lexical re-routing was chosen) with the intrusion detection architecture (e.g., FIG. 2), to complete the intrusion detection system (see 408).

FIGS. 5A-C are flow diagrams illustrating an exemplary API-level intrusion detection and re-routing procedure in accordance with some embodiments of the present disclosure. With reference to FIG. 5A, in some embodiments, a user 101 may provide input (see 501) into an application (e.g., an iPhone/iPad/Android app) executing on a user device 102 (e.g., a smartphone, tablet etc.). For example, the application may communicate with a web service (e.g., implemented at application server 104) to provide an application feature for the user. The user device 102 may process the user input, and determine that it is required to make an API call to the application server to respond to the user input. Accordingly, the user device may generate an API call to provide to the application server (see 502). The user device may send the API call (e.g., as a HTTP POST request) for providing to the application server. An example API call is provided below:

```
POST /rest/n_apiname HTTP/1.1
Host: www.webservice1.com
Content-Type: application/x-www-form-urlencoded
Content-Length: 46
    Api_key=213456543¶m1=aedc3r4&param2=md8945
```

In some embodiments, although the API call is ultimately intended to be provided to the application server 104, the API call may be directed to a monitoring server 103 instead (see 503). For example, in the API call above, "www.webservice1.com" may point to monitoring server 103 rather than application server 103. In alternate embodiments, the API call may be addressed to the application server itself (that is, in the example above, "www.webservice1.com" may point to application server 104 itself), but the application server may be configured to execute an intrusion detection module (e.g., via a DLL) that intercepts the API call before the API call is read by a web service application executing on the application server. For example, this may be achieved by the application server 103 parsing the API call to extract the name of the API call (which, in the example above, may be considered "n_apiname"), and using the API call name to determine whether the API call should be passed to the intrusion detection module. In the example above, the presence of the "n_" modifier before the rest of the API call name may be the trigger for intercepting the API call and passing it to the intrusion detection module. It is to be understood that although the disclosure hereinafter may refer to a monitoring server, the monitoring server 103 may be implemented as a standalone server, or as a process or application executing on the application server 104, or in any other configuration. In some embodiments, whether the API call is directed to a monitoring server 103 or to an intrusion detection module executing on the application server 104, rather than directed to the application server, may not be discoverable based on the API call template employed by a user, user device, or developer of the application executing on the user device.

In some embodiments, the monitoring server 103 may obtain the API call from the user device (see 504). The monitoring server may generate a local copy of the API call (see 505). For example, the local copying may be non-invasive, in that no processing (beyond temporary storage of the original version of the API call and creation of the local copy) may be performed using the original version of the API call, and all further processing for intrusion detection may be performed on the local copy of the API call (see, e.g., FIG. 2, T-Tap output 202). The monitoring server may parse the copy of the API call and extract the API name and API call parameters (see 506). For example, if the monitoring server utilizes PHP commands, the monitoring server may utilize the standard GET request ($_GET['param']) to extract the API call parameters from the API call. Using the API call name and/or API call parameters as inputs to a database query (e.g., using PHP/SQL commands such as SELECT), the monitoring server may identify and obtain the security rule(s) to apply to the API call for intrusion detection (see 507-508). In some embodiments, a user interface may be provided via which a security administrator may select options such as, without limitation: which API call names should be analyzed for intrusion detection; which application developers develop applications whose API calls are to be analyzed for intrusion detection; which security rules should apply to any particular set of API calls (e.g., grouped by application developer, application type, application usage, web application service provider, client(s) of the monitoring server administrator, etc.), or the like. It is to be understood that any combinations of application develop, application, API call and/or other parameters may be selected by the security administrator, and settings/rules for which API calls are to be analyzed for intrusion detection may be based on such combinations of parameters. An example of PHP/SQL commands to obtain the security rules using the API call name as a lookup variable is provided below:

```
<?PHP
header('Content-Type:text/plain');
mysql_connect("www.webservice1.com",$DBserver,$pass);
mysql_select_db("RULES.SQL");
$query="SELECT rule_id rule_expression FROM
    SecurityRulesTable WHERE api_name = $apiname";
$result=mysql_query($query);
mysql_close("RULES.SQL");
?>
```

In some embodiments, the security rules may be stored in a file (e.g., a CSV, text file, etc.), as an object in memory, a hash table, etc. In some embodiments, the security rules may be stored in a secure database, and may be accessed only by the monitoring server, or the intrusion detection module executing on the application server. In particular, in some embodiments, the application server, application developer, user device and user all may not have access to the security rules. Similarly, the security rules in some embodiments may only be modified by an administrator with appropriate security credentials for accessing the secure database. A security rule may define one or more tests to be performed on the API call, and may provide one or more recommended actions depending on the outcome of the one or more tests. An example of a security rule is provided in pseudo-code below:

```
RULE FrequencyTest {
    IF numrequests($api_name)>50 OVER time(01:00:00)
    THEN { setAPIstate("HOLD");
        createUIobject(last_request($api_name))
        createReport(last_request($api_name))
        addQueue(last_request($api_name), priority(3))
        doSecurityRule(DoS_Attack($api_name))}
}
```

In this example security rule called "FrequencyTest," if the number of API calls of the name stored in the variable '$api_name' received in the last hour exceeds fifty, the monitoring server is to proactively place a hold on the API call, and request the security administrator for authorization to allow the API call to be forwarded to the application server. Specifically, the monitoring server is to create a user interface object as well as a report based on the last API call request received, and place the request for administrator authorization in a queue. The security rule also calls for another security rule called "DoS_Attack" to be run on the API calls of the name stored in the variable '$api_name'. Three additional examples of security rules, implemented using Visual Basic (VB) code, are provided below. In a first example, assuming an API call is made by the user device to send an SMS message to a large number of recipients, a security rule implemented in VB code may test for the presence of blacklisted keywords in the SMS message.

```
Sub BlackListed_Keyword_Check_for_SMSPayload( )
Dim BadWord As String
Dim i As Integer
Dim SMSPayload As String
Sheets("Keyword Blacklist").Activate
Range("C4").Select
i = 0
Do Until IsEmpty(ActiveCell.Value)
        BadWord = Trim(ActiveCell.Value)
        Sheets("SMS Log").Activate
        Range("E3").Select
        Do Until IsEmpty(ActiveCell.Value)
            SMSPayload = Trim(ActiveCell.Value)
            ' MsgBox BadWord
            ' MsgBox SMSPayload
            ' MsgBox (InStr(SMSPayload, BadWord))
            If InStr(SMSPayload, BadWord) > 0 Then
                    ' MsgBox "Found the badword"
                    ActiveCell.Interior.Color =
RGB(255, 0, 0)
                Else
                    If ActiveCell.Interior.Color <>
RGB(255, 0, 0) Then ActiveCell.Interior.Color =
RGB(0, 255, 0)
                    ' Else: MsgBox "Its already red
and flagged from a prev match skip it"
                End If
            ' End If
            ActiveCell.Offset(1, 0).Select
        Loop
i = i + 1
Sheets("Keyword Blacklist").Activate
Range("C4").Select
ActiveCell.Offset(i, 0).Select
Loop
Sheets("SMS Log").Activate
Range("E3").Select
End Sub
```

In a second example, a security rule implemented in VB code may check a message sent via Wireless Application Protocol (WAP), e.g., to a mobile phone, to determine whether it engages in a phishing scam (e.g., whether it contains a link to a website hosting known malware).

```
Sub Phishing_URL_Check_for_WAPPush( )
Dim BadWord As String
Dim i As Integer
Dim WAPPushURL As String
Sheets("Phishing URL List").Activate
Range("C4").Select
i = 0
Do Until IsEmpty(ActiveCell.Value)
        BadWord = Trim(ActiveCell.Value)
        Sheets("WAP Push Log").Activate
        Range("E3").Select
        Do Until IsEmpty(ActiveCell.Value)
            WAPPushURL = Trim(ActiveCell.Value)
            ' MsgBox BadWord
            ' MsgBox SMSPayload
            ' MsgBox (InStr(SMSPayload, BadWord))
            If InStr(WAPPushURL, BadWord) > 0 Then
                    ' MsgBox "Found the badword"
                    ActiveCell.Interior.Color =
RGB(255, 0, 0)
                Else
                    If ActiveCell.Interior.Color <>
RGB(255, 0, 0) Then ActiveCell.Interior.Color =
RGB(0, 255, 0)
                    ' Else: MsgBox "Its already red
and flagged from a prev match skip it"
                End If
            ' End If
            ActiveCell.Offset(1, 0).Select
        Loop
i = i + 1
Sheets("Phishing URL List").Activate
Range("C4").Select
ActiveCell.Offset(i, 0).Select
Loop
Sheets("WAP Push Log").Activate
Range("E3").Select
End Sub
```

In a third example, a security rule implemented in VB code may check whether a large number of API calls are originating from a single location, or if there is a high density of API calls originating from a relatively small area (e.g., which may be indicative of misuse of the API call).

```
Sub Location_Log_Analysis_Step( )
' Macro1 Macro
' Location Log Analysis all Steps
    Range("B4:H21").Select
    ActiveWorkbook.Worksheets("Local Log Dashboard
Analysis").Sort.SortFields.Clear
    ActiveWorkbook.Worksheets("Local Log Dashboard
Analysis").Sort.SortFields.Add _
        Key:=Range("D4:D21"), SortOn:=xlSortOnValues, _
Order:=xlAscending, _
        DataOption:=xlSortNormal
    ActiveWorkbook.Worksheets("Local Log Dashboard
Analysis").Sort.SortFields.Add _
        Key:=Range("H4:H21"), SortOn:=xlSortOnValues, _
Order:=xlAscending, _
        DataOption:=xlSortNormal
    With ActiveWorkbook.Worksheets("Local Log
Dashboard Analysis").Sort
        .SetRange Range("B4:H21")
        .Header = xlGuess
        .MatchCase = False
        .Orientation = xlTopToBottom
        .SortMethod = xlPinYin
        .Apply
    End With
```

```
Range("G25").Select
Range("I2").Select
With Selection
        .HorizontalAlignment = xlGeneral
        .VerticalAlignment = xlCenter
        .WrapText = False
        .Orientation = 0
        .AddIndent = False
        .ShrinkToFit = False
        .ReadingOrder = xlContext
        .MergeCells = False
End With
ActiveCell.FormulaR1C1 = "Tally"
Range("I4").Select
ActiveCell.FormulaR1C1 = "1"
Range("I5").Select
ActiveCell.FormulaR1C1 = _
    "=IF(AND((RC[-5]=R[-1]C[-5]),(RC[-1]=R[-1]C[-1])),1+R[-1]C,1)"
Range("I5").Select
Selection.AutoFill Destination:=Range("I5:I6"), Type:=xlFillDefault
Range("I5:I6").Select
Selection.AutoFill Destination:=Range("I5:I21"), Type:=xlFillDefault
Range("I5:I21").Select
With Selection
        .HorizontalAlignment = xlCenter
        .VerticalAlignment = xlBottom
        .WrapText = False
        .Orientation = 0
        .AddIndent = False
        .IndentLevel = 0
        .ShrinkToFit = False
        .ReadingOrder = xlContext
        .MergeCells = False
End With
Range("I4").Select
With Selection
        .HorizontalAlignment = xlCenter
        .VerticalAlignment = xlBottom
        .WrapText = False
        .Orientation = 0
        .AddIndent = False
        .IndentLevel = 0
        .ShrinkToFit = False
        .ReadingOrder = xlContext
        .MergeCells = False
End With
    Range("J2").Select
With Selection
        .HorizontalAlignment = xlGeneral
        .VerticalAlignment = xlCenter
        .WrapText = False
        .Orientation = 0
        .AddIndent = False
        .ShrinkToFit = False
        .ReadingOrder = xlContext
        .MergeCells = False
End With
ActiveCell.FormulaR1C1 = "Reset"
Range("J4:J21").Select
With Selection
        .HorizontalAlignment = xlCenter
        .VerticalAlignment = xlBottom
        .WrapText = False
        .Orientation = 0
        .AddIndent = False
        .IndentLevel = 0
        .ShrinkToFit = False
        .ReadingOrder = xlContext
        .MergeCells = False
End With
Range("J4").Select
ActiveCell.FormulaR1C1 = "0"
Range("J5").Select
ActiveCell.FormulaR1C1 = "=IF"
Range("J5").Select
ActiveCell.FormulaR1C1 = "=IF(RC[-1]>R[-1]C[-1],0,1)"
Range("J5").Select
Selection.AutoFill Destination:=Range("J5:J21"), Type:=xlFillDefault
Range("J5:J21").Select
Application.Width = 1080
Application.Height = 609.75
Range("K2").Select
With Selection
        .HorizontalAlignment = xlGeneral
        .VerticalAlignment = xlCenter
        .WrapText = False
        .Orientation = 0
        .AddIndent = False
        .ShrinkToFit = False
        .ReadingOrder = xlContext
        .MergeCells = False
End With
    Range("K2").Select
ActiveCell.FormulaR1C1 = "Interval"
Range("K2:K21").Select
With Selection
        .HorizontalAlignment = xlCenter
        .WrapText = False
        .Orientation = 0
        .AddIndent = False
        .IndentLevel = 0
        .ShrinkToFit = False
        .ReadingOrder = xlContext
        .MergeCells = False
End With
Selection.NumberFormat = "General"
Range("K10").Select
ActiveCell.FormulaR1C1 = _
    "=MAX(R[-6]C[-9]:R[-1]C[-9])-MIN(R[-6]C[-9]:R[-1]C[-9])"
Range("K14").Select
ActiveCell.FormulaR1C1 = " "
Range("K15").Select
ActiveCell.FormulaR1C1 = _
    "=MAX(R[-3]C[-9]:R[-1]C[-9])-MIN(R[-3]C[-9]:R[-1]C[-9])"
Range("K16").Select
ActiveWorkbook.Save
Range("B4:H9").Select
With Selection.Interior
        .Pattern = xlSolid
        .PatternColorIndex = xlAutomatic
        .Color = 255
        .TintAndShade = 0
        .PatternTintAndShade = 0
End With
Range("B12:H14").Select
With Selection.Interior
        .Pattern = xlSolid
        .PatternColorIndex = xlAutomatic
        .Color = 65535
        .TintAndShade = 0
        .PatternTintAndShade = 0
End With
```

It is to be understood that the above rules are only examples, and a wide variety of rules operating in various contexts on any combination of API call names, API call parameters, and other variables are contemplated.

In some embodiments, the monitoring server may apply the security rules obtained from a security file, object, or database to the API call. For example, the monitoring server may select a security rule (see 509), and parse the security rule to extract the security test to apply to the API call (see 510). Upon identifying the requirements of the test, the monitoring server may obtain the necessary information and apply the test to the information (e.g., API call name, API call parameters, call frequency, call locations, etc.) (see 511). The monitoring server may determine whether the test is passed (see 512). If the test is passed, the monitoring server may check to see if additional security rules need to be applied (see 513), and may apply those additional security rules. If all the security rules have been passed, the monitoring server may determine that the API call can be re-routed to the application server or application process and may initiate API call re-routing accordingly (see 514).

In some embodiments, if a test of a security rule is not passed (see 512, option "No"), the monitoring server may determine the next actions to take. With reference to FIG. 5B, in some embodiments, the monitoring server may determine whether the security rule requires the monitoring server to proactively block the API call (see 515). If the monitoring server determines that the API call should be proactively blocked, the monitoring server may delete the original version of the API call, so that it cannot be forwarded to the application server or application process (see 516). The monitoring server may also determine whether the API call should be brought to the attention of the security administrator (see 517). If the monitoring server determines that the API call should be reported to the security administrator, the monitoring server may generate (or update, if one has already been created for the API call) a report and/or a dashboard UI object for presentation via a graphical user interface to the security administrator (see 518). The monitoring server may determine whether there are additional security rules to process for the API call (see 519), and process any such security rules in a manner like that described above.

In some embodiments, once all required security rules have been processed, if the API call has already been proactively blocked (see 520), the monitoring server may determine that no further action is required, and end processing for the current API call (e.g., the monitoring server may move on to processing another API call). If the monitoring server determines that the security administrator can grant authorization to re-route the API call to the application server or process (see 521), the monitoring server may determine a queue priority value for the report and/or dashboard UI object (e.g., to determine a position within a report queue for the API call) (see 522). The monitoring server may insert the report and/or dashboard UI object into the report queue according to the priority value assigned to the report and/or dashboard UI object (see 523). For example, the priority value may be determined based on instructions included in the security rule, and/or a timestamp associated with the API call. In some embodiments, the reporting to the security administrator may be necessary to authorize the re-routing of the API call (see 524). In such cases, the monitoring server may wait for the security administrator to respond (see 526). If the security administrator does not provide the authorization (see 525, option "No"), the monitoring server may delete the original version of the API call to prevent it from being re-routed to the application server or process (see 527). In some embodiments, the reporting to the security administrator may be needed only for reporting purposes, and not necessary to authorize the re-routing of the API call (see 524, option "No"). In such cases, the monitoring server may initiate the API call re-routing (see 528).

With reference to FIG. 5C, in some embodiments, the monitoring server may re-route the API call to the application server (e.g., in the case of IP re-routing) or the application process (e.g., in the case of lexical re-routing). The monitoring server may determine whether to perform IP or lexical re-routing (see 529). The monitoring server may determine this based on the format of the API call obtained from the user device. If the API call was addressed to the monitoring server, then the monitoring server may determine that IP re-routing is required. If the API call name includes a trigger for passing the API call to another process (e.g., an application process), then the monitoring server may determine that lexical re-routing is required. If IP re-routing is required, the monitoring server may obtain the IP address from the original API call or from the local copy (see 530). The monitoring server may determine a new IP address (e.g., that of the application server) for re-routing the API call (see 531). For example, the monitoring server may utilize a lookup table using the IP address from the original API call as a lookup variable. The monitoring server may create a new API call using the new IP address (see 532). An example new API call is provided below:

```
POST /rest/n_apiname HTTP/1.1
Host: www.webservice.com
Content-Type: application/x-www-form-urlencoded
Content-Length: 46
    Api_key=213456543¶m1=aedc3r4&param2=md8945
```

In this example, the URL "www.webservice.com" may point to the new IP address (e.g., of the application server), and the new API call may be otherwise unchanged from the original API call. The monitoring server may provide the new API call to the application server (see 533).

In some embodiments, if lexical re-routing is required, the monitoring server may obtain the API call name from the original API call or from the local copy (see 540). The monitoring server may determine a new API call name (e.g., that of a service provided by the application server) for re-routing the API call (see 541). For example, the monitoring server may utilize a lookup table using the API call name from the original API call as a lookup variable. The monitoring server may create a new API call using the new API call name (see 542). An example new API call is provided below:

```
POST /rest/apiname HTTP/1.1
Host: www.webservice1.com
Content-Type: application/x-www-form-urlencoded
Content-Length: 46
    Api_key=213456543¶m1=aedc3r4&param2=md8945
```

In this example, the API name "apiname" may point to the application service of the application server, and the new API call may be otherwise unchanged from the original API call. The monitoring server may provide the new API call to the application service (process) of the application server (see 543). In some embodiments, both IP and lexical re-routing may be simultaneously performed, whereas in alternative embodiments, only one or the other may be performed.

FIGS. 6A-C are block and user interface diagrams illustrating exemplary aspects of user interfaces in accordance with some embodiments of the present disclosure. With reference to FIG. 6A, in some embodiments, the intrusion detection system (IDS) may provide a number of auxiliary features via one or more graphical user interfaces to a security administrator of the intrusion detection system. For example, the IDS may log the parameters of all API calls it receives (see 601), and may also identify and log and security rule violations based on application of security rules, as well as provide other debugging support to the received API calls (see 602). Accordingly, in various embodiments, the IDS may provide security intrusion detection (see 610), cloud/cloud and/or local log storage management (see 611), new feature support to the baseline application being developed (see 612) (e.g., monitoring to determine efficacy of the new feature; identifying errors in the new feature based on user behavior, etc.), API internal threat mitigation (see 613) (e.g., by recommending steps to reduce incidences of a threat, or modification of security rules to minimize a threat), specific feature addition to the web APIs offered and exposed by the developed application (see 614), flex programming and integrated development environment (IDE) support for application developers, e.g., providing the current method and system as a plug-in for Visual Studio or Eclipse (see 615), usage statistics and customer profiling (see 616), advanced analytics (see 617), timing and performance monitoring (see 618) (e.g., determining throughput and load capability of the application services' computing systems), and/or compliance and audit support (see 619).

The above examples are for the purposes of illustration only and not to be construed as limiting. Overall, any and all capability extension that can be supported as a middleware can be incorporated to the SDK design herein. Such middleware capabilities include the following additional technical features and solutions: (1) failover and/or failsafe design extensions, (2) QoS accelerators, (3) Monetization and revenue generators, (4) Framework applications support, and (5) API mashups.

As non-limiting examples, with reference to FIG. 6B, in some embodiments, the IDS may provide a UI depicting API usage statistics (see "(1) Example dashboard output"). The API may be identified by an API key that may be manually entered by a user or selected from a dropdown list, etc., and usage statistics may be plotted for user-selectable dates between a start date and end date. The user may be able to plot multiple variables simultaneously (e.g., number of requests vs. date, and average response time vs. date). The UI may provide curve-fitting and other statistical analysis capabilities, and the results may be exported into other (portable) formats.

As another example, in some embodiments, the IDS may provide a UI depicting incidences of security threats, and analysis regarding their source and intended destinations (see "(2) Example threat incidence output"). For example, the UI may include one or more charts depicting such variables like the most-frequent source IP addresses for the threats, the most-frequent source port numbers for the threats, the most-frequent destination IP addresses for the threats and the most-frequent destination port numbers for the threats. The manner of depiction (e.g., pie chart, bar graph, scatter plot, etc.) may be modified using graphical user interface (GUI) elements associated with a frame within which the graphics are depicted. The variables (e.g., source IP address, source port number, destination IP address, destination port number) using which the analysis is performed may be varied using GUI elements associated with a frame within which the graphics are depicted. In addition, in some embodiments, summaries may be provided listing the most significant variables (e.g., obtained using independent or principal component analysis, etc.), and the incidences of threat depending on the values of these variables (e.g., use of an IPv6 address at the source of the threats, or use of IPv4 address at the source of the threat, etc.). In addition, any relationship between two or more variables can be plotted in a frame within the UI (e.g., the variables may be selected using a dropdown menu, or by manual entry by a user).

With reference to FIG. 6C, in some embodiments, the IDS may provide a UI depicting statistics or analysis related to a specific application (e.g., identifying attacks attempted on mobile device users using messages sent via Wireless Application Protocol (WAP)). For example, the user may select a type of parameter (e.g., SMS, MMS, location, etc.), a type of analysis (e.g., use stats, analytics, performance monitoring, compliance audit, security intrusions, etc.), and a type of threat (e.g., denial of service, malware infection, profanity, etc.). Based on the parameters selected, the UI may provide a display specific to the selected options. In some embodiments, the UI may also allow a user to drill down into a detailed view of the data (e.g., zoomed, 3D render, etc.), and delegate or escalate a view to another security administrator. The user may use graphical tools to annotate an analysis, save an annotated analysis (or open a previously created analysis), and engage in communications with other security administrators (e.g., via chat, mail, text, etc.).

Additional illustrative embodiments are listed below. In some embodiments, a non-transitory computer-readable medium is disclosed, storing computer-executable API-level intrusion detection instructions for: receiving an application programming interface (API) call for a service at an API sandbox module; parsing the API call to extract at least one of: an API call name; and one or more API call parameters; generating a copy of the at least one of: the API call name and the one or more API call parameters; providing, to an intrusion detection rules execution engine, the copy of the at least one of: the API call name and the one or more API call parameters; determining, via the intrusion detection rules execution engine, whether the API call is in violation of one or more security rules obtained from a security rules object; and providing an indication of whether the API call is in violation of the one or more security rules. In some embodiments, the medium may be further storing instructions for: determining that the API call is not in violation of the one or more security rules; generating at least one of: a new API call name; and a new API call address, after determining that the API call is not in violation of the one or more security rules; wherein the generated at least one of: the new API call name; and the new API call address is the indication of whether the API call is in violation of the one or more security rules; generating a new API call for the service using the generated at least one of: the new API call name; and the new API call address; and providing the generated new API call for the service. In some embodiments, the medium may be further storing instructions for: generating at least one of: a new API call name; and a new API call address, regardless of whether the API call is in violation of the one or more security rules; generating a new API call for the service using the generated at least one of: the new API call name; and the new API call address; and providing the generated new API call for the service. In some embodiments, the medium may be further storing instructions for: determining that the API call is in violation of the one or more security rules; and providing the indication of whether the API call is in violation of the one or more security rules via a user interface dashboard. In some embodiments, the medium may be further storing instructions for: determining that the API call is in violation of the one or more security rules; providing the indication of whether the API call is in violation of the one or more security rules via a user interface dashboard; obtaining user authorization input via the user interface dashboard; if the user authorization input authorizes API call re-routing, generating at least one of: a new API call name; and a new API call address, generating a new API call for the service using the generated at least one of: the new API call name; and the new API call address, and providing the generated new API call for the service; and if the user authorization input does not authorize API call re-routing, rejecting the API call for the service. In some embodiments, the service may be a web application service. In some embodiments, determining whether the API call is in violation of the one or more security rules may include determining whether the copy of the at least one of: the API call name and the one or more API call parameters matches a parameter in the one or more security rules. In some embodiments, the new API call name may be generated, by extracting a string subset of the copy of the API call name. In some embodiments, an API call address for the generated new API call may be the same as an API call address for the API call for the service received at the API sandbox module. In some embodiments, the new API call address may be generated, by providing the copy of the API call name as input to a lookup table. In some embodiments, an API call name for the generated new API call is the same as an API call name for the API call for the service received at the API sandbox module. In some embodiments, the intrusion detection rules execution engine may be of one of the following types: forward-chained; backward-chained; and rule priority based execution ordering. In some embodiments, the security rules object may include one or more security rules configured to detect malware. In some embodiments, the security rules object may include one or more security rules configured to detect application-level misuse. In some embodiments, the security rules object may include one or more security rules specifically applicable to the copy of the API call name. In some embodiments, the security rules object may be configurable via a user interface dashboard. In some embodiments, configuration of the security rules object via the user interface dashboard may be performed substantially in real-time with determining whether the API call is in violation of the one or more security rules. In some embodiments, the security rules object may be configured to be inaccessible to application developers, end-users, and a provider of the service. In some embodiments, the security rules object is used for all API calls for the service received at the API sandbox module. In some embodiments, the medium may be further storing instructions for: determining whether to provide, to the intrusion detection rules execution engine, the copy of the at least one of: the API call name and the one or more API call parameters, based on one or more user selections of application developers whose applications' API calls are to be analyzed for intrusion detection. In some embodiments, the medium may be further storing instructions for: determining whether to provide, to the intrusion detection rules execution engine, the copy of the at least one of: the API call name and the one or more API call parameters, based on one or more user selections of API call names of API calls to be analyzed for intrusion detection. In some embodiments, the API sandbox module may be co-located at an enterprise software gateway, and be configured for: receiving API calls for all the user selected developers and user selected API name references; and processing the API calls for application specific intrusion detection.

In some embodiments, an API-level intrusion detection method is disclosed, comprising: receiving an application programming interface (API) call for a service at an API sandbox module; parsing the API call to extract at least one of: an API call name; and one or more API call parameters; generating a copy of the at least one of: the API call name and the one or more API call parameters; providing, to an intrusion detection rules execution engine, the copy of the at least one of: the API call name and the one or more API call parameters; determining, via the intrusion detection rules execution engine, whether the API call is in violation of one or more security rules obtained from a security rules object; and providing an indication of whether the API call is in violation of the one or more security rules. In some embodiments, the method may further comprise: determining that the API call is not in violation of the one or more security rules; generating at least one of: a new API call name; and a new API call address, after determining that the API call is not in violation of the one or more security rules; wherein the generated at least one of: the new API call name; and the new API call address is the indication of whether the API call is in violation of the one or more security rules; generating a new API call for the service using the generated at least one of: the new API call name; and the new API call address; and providing the generated new API call for the service. In some embodiments, the method may further comprise: generating at least one of: a new API call name; and a new API call address, regardless of whether the API call is in violation of the one or more security rules; generating a new API call for the service using the generated at least one of: the new API call name; and the new API call address; and providing the generated new API call for the service. In some embodiments, the method may further comprise: determining that the API call is in violation of the one or more security rules; and providing the indication of whether the API call is in violation of the one or more security rules via a user interface dashboard. In some embodiments, the method may further comprise: determining that the API call is in violation of the one or more security rules; providing the indication of whether the API call is in violation of the one or more security rules via a user interface dashboard; obtaining user authorization input via the user interface dashboard; if the user authorization input authorizes API call re-routing, generating at least one of: a new API call name; and a new API call address, generating a new API call for the service using the generated at least one of: the new API call name; and the new API call address, and providing the generated new API call for the service; and if the user authorization input does not authorize API call re-routing, rejecting the API call for the service. In some embodiments, the service may be a web application service. In some embodiments, determining whether the API call is in violation of the one or more security rules may include determining whether the copy of the at least one of: the API call name and the one or more API call parameters matches a parameter in the one or more security rules. In some embodiments, the new API call name may be generated, by extracting a string subset of the copy of the API call name. In some embodiments, an API call address for the generated new API call may be the same as an API call address for the API call for the service received at the API sandbox module. In some embodiments, the new API call address may be generated, by providing the copy of the API call name as input to a lookup table. In some embodiments, an API call name for the generated new API call is the same as an API call name for the API call for the service received at the API sandbox module. In some embodiments, the intrusion detection rules execution engine may be of one of the following types: forward-chained; backward-chained; and rule priority based execution ordering. In some embodiments, the security rules object may include one or more security rules configured to detect malware. In some embodiments, the security rules object may include one or more security rules configured to detect application-level misuse. In some embodiments, the security rules object may include one or more security rules specifically applicable to the copy of the API call name. In some embodiments, the security rules object may be configurable via a user interface dashboard. In some embodiments, configuration of the security rules object via the user interface dashboard may be performed substantially in real-time with determining whether the API call is in violation of the one or more security rules. In some embodiments, the security rules object may be configured to be inaccessible to application developers, end-users, and a provider of the service. In some embodiments, the security rules object is used for all API calls for the service received at the API sandbox module. In some embodiments, the method may further comprise: determining whether to provide, to the intrusion detection rules execution engine, the copy of the at least one of: the API call name and the one or more API call parameters, based on one or more user selections of application developers whose applications' API calls are to be analyzed for intrusion detection. In some embodiments, the method may further comprise: determining whether to provide, to the intrusion detection rules execution engine, the copy of the at least one of: the API call name and the one or more API call parameters, based on one or more user selections of API call names of API calls to be analyzed for intrusion detection. In some embodiments, the API sandbox module may be co-located at an enterprise software gateway, and be configured for: receiving API calls for all the user selected developers and user selected API name references; and processing the API calls for application specific intrusion detection.

In some embodiments, an API-level intrusion detection system is disclosed, comprising: one or more hardware processors; and one or more memory devices disposed in communication with the one or more hardware processors, and storing instructions executable by the one or more hardware processors for: receiving an application programming interface (API) call for a service at an API sandbox module; parsing the API call to extract at least one of: an API call name; and one or more API call parameters; generating a copy of the at least one of: the API call name and the one or more API call parameters; providing, to an intrusion detection rules execution engine, the copy of the at least one of: the API call name and the one or more API call parameters; determining, via the intrusion detection rules execution engine, whether the API call is in violation of one or more security rules obtained from a security rules object; and providing an indication of whether the API call is in violation of the one or more security rules. In some embodiments, the one or more memory devices may be further storing instructions for: determining that the API call is not in violation of the one or more security rules; generating at least one of: a new API call name; and a new API call address, after determining that the API call is not in violation of the one or more security rules; wherein the generated at least one of: the new API call name; and the new API call address is the indication of whether the API call is in violation of the one or more security rules; generating a new API call for the service using the generated at least one of: the new API call name; and the new API call address; and providing the generated new API call for the service. In some embodiments, the one or more memory devices may be further storing instructions for: generating at least one of: a new API call name; and a new API call address, regardless of whether the API call is in violation of the one or more security rules; generating a new API call for the service using the generated at least one of: the new API call name; and the new API call address; and providing the generated new API call for the service. In some embodiments, the one or more memory devices may be further storing instructions for: determining that the API call is in violation of the one or more security rules; and providing the indication of whether the API call is in violation of the one or more security rules via a user interface dashboard. In some embodiments, the one or more memory devices may be further storing instructions for: determining that the API call is in violation of the one or more security rules; providing the indication of whether the API call is in violation of the one or more security rules via a user interface dashboard; obtaining user authorization input via the user interface dashboard; if the user authorization input authorizes API call re-routing, generating at least one of: a new API call name; and a new API call address, generating a new API call for the service using the generated at least one of: the new API call name; and the new API call address, and providing the generated new API call for the service; and if the user authorization input does not authorize API call re-routing, rejecting the API call for the service. In some embodiments, the service may be a web application service. In some embodiments, determining whether the API call is in violation of the one or more security rules may include determining whether the copy of the at least one of: the API call name and the one or more API call parameters matches a parameter in the one or more security rules. In some embodiments, the new API call name may be generated, by extracting a string subset of the copy of the API call name. In some embodiments, an API call address for the generated new API call may be the same as an API call address for the API call for the service received at the API sandbox module. In some embodiments, the new API call address may be generated, by providing the copy of the API call name as input to a lookup table. In some embodiments, an API call name for the generated new API call is the same as an API call name for the API call for the service received at the API sandbox module. In some embodiments, the intrusion detection rules execution engine may be of one of the following types: forward-chained; backward-chained; and rule priority based execution ordering. In some embodiments, the security rules object may include one or more security rules configured to detect malware. In some embodiments, the security rules object may include one or more security rules configured to detect application-level misuse. In some embodiments, the security rules object may include one or more security rules specifically applicable to the copy of the API call name. In some embodiments, the security rules object may be configurable via a user interface dashboard. In some embodiments, configuration of the security rules object via the user interface dashboard may be performed substantially in real-time with determining whether the API call is in violation of the one or more security rules. In some embodiments, the security rules object may be configured to be inaccessible to application developers, end-users, and a provider of the service. In some embodiments, the security rules object is used for all API calls for the service received at the API sandbox module. In some embodiments, the one or more memory devices may be further storing instructions for: determining whether to provide, to the intrusion detection rules execution engine, the copy of the at least one of: the API call name and the one or more API call parameters, based on one or more user selections of application developers whose applications' API calls are to be analyzed for intrusion detection. In some embodiments, the one or more memory devices may be further storing instructions for: determining whether to provide, to the intrusion detection rules execution engine, the copy of the at least one of: the API call name and the one or more API call parameters, based on one or more user selections of API call names of API calls to be analyzed for intrusion detection. In some embodiments, the API sandbox module may be co-located at an enterprise software gateway, and be configured for: receiving API calls for all the user selected developers and user selected API name references; and processing the API calls for application specific intrusion detection.

Computer System

FIG. 7 is a block diagram of an exemplary computer system for implementing embodiments consistent with the present disclosure. Variations of computer system 701 may be used for implementing user device 102, monitoring server 103, application server 104, or other computer systems included in the disclosure. Computer system 701 may comprise a central processing unit ("CPU" or "processor") 702. Processor 702 may comprise at least one data processor for executing program components for executing user- or system-generated requests. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 702 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 702 may be disposed in communication with one or more input/output (I/O) devices via I/O interface 703. The I/O interface 703 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 703, the computer system 701 may communicate with one or more I/O devices. For example, the input device 704 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 705 may be a printer, fax machine, video display (e.g., cathode ray tube (CRT), liquid crystal display (LCD), light-emitting diode (LED), plasma, or the like), audio speaker, etc. In some embodiments, a transceiver 706 may be disposed in connection with the processor 702. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 702 may be disposed in communication with a communication network 708 via a network interface 707. The network interface 707 may communicate with the communication network 708. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 708 may include, without limitation, a direct interconnection, local area network (LAN), wide area network (WAN), wireless network (e.g., using Wireless Application Protocol), the Internet, etc. Using the network interface 707 and the communication network 708, the computer system 701 may communicate with devices 710, 711, and 712. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 701 may itself embody one or more of these devices.

In some embodiments, the processor 702 may be disposed in communication with one or more memory devices (e.g., RAM 713, ROM 714, etc.) via a storage interface 712. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 716, user interface application 717, web browser 718, mail server 719, mail client 720, user/application data 721 (e.g., any data variables or data records discussed in this disclosure), etc. The operating system 716 may facilitate resource management and operation of the computer system 701. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 717 may facilitate display, execution, interaction, manipulation, or operation of program components through textual or graphical facilities. For example, user interfaces may provide computer interaction interface elements on a display system operatively connected to the computer system 701, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 701 may implement a web browser 718 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 701 may implement a mail server 719 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 701 may implement a mail client 720 stored program component. The mail client may be a mail viewing application, such as Apple Mail, Microsoft Entourage, Microsoft Outlook, Mozilla Thunderbird, etc.

In some embodiments, computer system 701 may store user/application data 721, such as the data, variables, records, etc. (e.g., security rules file/object/DB, reports, dashboard UI objects, report queue, etc.) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The specification has described methods and systems for API-level intrusion detection. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage mediums may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A non-transitory computer-readable medium storing computer-executable application programming interface (API)-level intrusion detection instructions for:
   receiving an API call for a service at an API sandbox module;
   parsing the API call to extract at least one of: an API call name; or one or more API call parameters;
   generating a copy of the at least one of: the API call name or the one or more API call parameters;
   providing, to an intrusion detection rules execution engine, the copy of the at least one of: the API call name or the one or more API call parameters;
   determining, via the intrusion detection rules execution engine, whether the API call is in violation of one or more security rules obtained from a security rules object; and
   providing an indication of whether the API call is in violation of the one or more security rules;
   wherein the API sandbox module is co-located at an enterprise software gateway, and is configured for:
      receiving API calls for user selected developers and user selected API name references, and
      processing the received API calls for application specific intrusion detection.

2. The medium of claim 1, further storing instructions for:
   determining that the API call is not in violation of the one or more security rules;
   generating, after determining that the API call is not in violation of the one or more security rules, at least one of: a new API call name; or a new API call address;
   wherein the generated at least one of: the new API call name; or the new API call address is the indication of whether the API call is in violation of the one or more security rules;
   generating a new API call for the service using the generated at least one of: the new API call name; or the new API call address; and
   providing the generated new API call for the service.

3. The medium of claim 1, further storing instructions for:
   generating at least one of: a new API call name; or a new API call address, regardless of whether the API call is in violation of the one or more security rules;
   generating a new API call for the service using the generated at least one of: the new API call name; or the new API call address; and
   providing the generated new API call for the service.

4. The medium of claim 3, further storing instructions for:
   determining that the API call is in violation of the one or more security rules; and
   providing the indication of whether the API call is in violation of the one or more security rules via a user interface dashboard.

5. The medium of claim 1, further storing instructions for:
   determining that the API call is in violation of the one or more security rules;
   providing the indication of whether the API call is in violation of the one or more security rules via a user interface dashboard;
   obtaining user authorization input via the user interface dashboard;
   if the user authorization input authorizes API call re-routing,
      generating at least one of: a new API call name; or a new API call address,
      generating a new API call for the service using the generated at least one of: the new API call name; or the new API call address, and
      providing the generated new API call for the service; and
   if the user authorization input does not authorize API call re-routing, rejecting the API call for the service.

6. The medium of claim 1, wherein the service is a web application service.

7. The medium of claim 1, wherein determining whether the API call is in violation of the one or more security rules includes determining whether the copy of the at least one of: the API call name or the one or more API call parameters matches a parameter in the one or more security rules.

8. The medium of claim 2, wherein the new API call name is generated, by extracting a string subset of the copy of the API call name.

9. The medium of claim 8, wherein an API call address for the generated new API call is the same as an API call address for the API call for the service received at the API sandbox module.

10. The medium of claim 2, wherein the new API call address is generated, by providing the copy of the API call name as input to a lookup table.

11. The medium of claim 10, wherein an API call name for the generated new API call is the same as an API call name for the API call for the service received at the API sandbox module.

12. The medium of claim 1, wherein the intrusion detection rules execution engine is of one of the following types: forward-chained; backward-chained; and rule priority based execution ordering.

13. The medium of claim 1, wherein the security rules object includes one or more security rules configured to detect malware.

14. The medium of claim 1, wherein the security rules object includes one or more security rules configured to detect application-level misuse.

15. The medium of claim 1, wherein the security rules object includes one or more security rules specifically applicable to the copy of the API call name.

16. The medium of claim 1, wherein the security rules object is configurable via a user interface dashboard.

17. The medium of claim 16, wherein configuration of the security rules object via the user interface dashboard may be performed substantially in real-time with determining whether the API call is in violation of the one or more security rules.

18. The medium of claim 1, wherein the security rules object is configured to be inaccessible to application developers, end-users, and a provider of the service.

19. The medium of claim 1, wherein the security rules object is used for all API calls for the service received at the API sandbox module.

20. The medium of claim 1, further storing instructions for:
determining whether to provide, to the intrusion detection rules execution engine, the copy of the at least one of: the API call name or the one or more API call parameters, based on one or more user selections of application developers whose applications' API calls are to be analyzed for intrusion detection.

21. The medium of claim 1, further storing instructions for:
determining whether to provide, to the intrusion detection rules execution engine, the copy of the at least one of: the API call name or the one or more API call parameters, based on one or more user selections of API call names of API calls to be analyzed for intrusion detection.

22. An application programming interface (API)-level intrusion detection method, comprising:
receiving an API call for a service at an API sandbox module;
parsing the API call to extract at least one of: an API call name; or one or more API call parameters;
generating a copy of the at least one of: the API call name or the one or more API call parameters;
providing, to an intrusion detection rules execution engine including one or more hardware processors, the copy of the at least one of: the API call name or the one or more API call parameters;
determining, via the intrusion detection rules execution engine, whether the API call is in violation of one or more security rules obtained from a security rules object; and
providing an indication of whether the API call is in violation of the one or more security rules;
wherein the API sandbox module is co-located at an enterprise software gateway, and is configured for:
receiving API calls for user selected developers and user selected API name references, and
processing the received API calls for application specific intrusion detection.

23. The method of claim 22, further comprising:
determining that the API call is not in violation of the one or more security rules;
generating, after determining that the API call is not in violation of the one or more security rules, at least one of: a new API call name; or a new API call address;
wherein the generated at least one of: the new API call name; or the new API call address is the indication of whether the API call is in violation of the one or more security rules;
generating a new API call for the service using the generated at least one of: the new API call name; or the new API call address; and
providing the generated new API call for the service.

24. The method of claim 22, further comprising:
generating at least one of: a new API call name; or a new API call address, regardless of whether the API call is in violation of the one or more security rules;
generating a new API call for the service using the generated at least one of: the new API call name; or the new API call address; and
providing the generated new API call for the service.

25. The method of claim 22, further comprising:
determining that the API call is in violation of the one or more security rules; and
providing the indication of whether the API call is in violation of the one or more security rules via a user interface dashboard.

26. The method of claim 22, further comprising:
determining that the API call is in violation of the one or more security rules;
providing the indication of whether the API call is in violation of the one or more security rules via a user interface dashboard;
obtaining user authorization input via the user interface dashboard;
if the user authorization input authorizes API call re-routing,
generating at least one of: a new API call name; or a new API call address,
generating a new API call for the service using the generated at least one of: the new API call name; or the new API call address, and
providing the generated new API call for the service; and
if the user authorization input does not authorize API call re-routing, rejecting the API call for the service.

27. The method of claim 22, wherein determining whether the API call is in violation of the one or more security rules includes determining whether the copy of the at least one of: the API call name or the one or more API call parameters matches a parameter in the one or more security rules.

28. The method of claim 23, wherein the new API call name is generated, by extracting a string subset of the copy of the API call name.

29. The method of claim 23, wherein the new API call address is generated, by providing the copy of the API call name as input to a lookup table.

* * * * *